US006355282B1

(12) United States Patent
Mori et al.

(10) Patent No.: US 6,355,282 B1
(45) Date of Patent: *Mar. 12, 2002

(54) DOUGH COMPOSITION AND PREPARATION THEREOF

(75) Inventors: Shigeharu Mori; Kimihiko Sato; Noriaki Tanaka, all of Aichi (JP)

(73) Assignee: Amano Pharmaceutical Co., Ltd., Aichi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,212

(22) Filed: Oct. 30, 1998

(30) Foreign Application Priority Data

Oct. 31, 1997 (JP) .............................. 9-315953

(51) Int. Cl.⁷ ................................. A21D 2/00
(52) U.S. Cl. ............................. 426/20; 426/18; 426/52; 426/549
(58) Field of Search ..................... 426/20, 49, 52, 426/18, 19, 549

(56) References Cited

U.S. PATENT DOCUMENTS 5,698,245 A * 12/1997 Tanaka et al. ................ 426/10

FOREIGN PATENT DOCUMENTS

| EP | 0 419 907 | 4/1991 |
| EP | 0 585 988 | 3/1994 |
| EP | 0686 348 | 12/1995 |
| JP | 04 207144 | 7/1992 |

OTHER PUBLICATIONS

Fujimura et al, Patent Abstracts of Japan, abstracting 04–207144, Nov. 1992.*

Valjakka, Ponte, Kulp: "Studies on Raw–Starch Digesting Enzyme I Comparison to Fungal and Bacterial Enzymes and an Emulsifier in White Pan Bread" Cereal Chemistry, vol. 71, No. 2, 1994, pp. 139–144.

Ueda, S., *J. Jap. Soc. Starch Sci.*, Amylase Adsorption on Raw Starch and Its Relation to Raw Starch Digestion, vol. 25, 124–131 (1978) (with English Abstract).

* cited by examiner

*Primary Examiner*—Leslie Wong
(74) *Attorney, Agent, or Firm*—Sughrue Mion, PLLC

(57) ABSTRACT

A dough composition containing not less than 15 units of a raw starch decomposing enzyme per kilogram of a raw material to be baked, which may further contain glucose oxidase and/or hemicellulase. The characteristics of the dough composition are improved to provide baked products which have improved softness and are slow in getting hard.

8 Claims, No Drawings

DOUGH COMPOSITION AND PREPARATION THEREOF

FIELD OF THE INVENTION

This invention relates to a dough composition, i.e., a mixture to be baked, particularly an improved dough composition for bread. More particularly, it relates to incorporation of an effective amount of an enzyme having raw starch decomposing activity in dough as a substitute of a conventional emulsifying agent. A baked product prepared therefrom has improved softness and is slow in getting hard.

BACKGROUND OF THE INVENTION

In preparing bread, various oxidizing agents, reducing agents, enzymes, emulsifying agents, and the like have been used as bread improvers.

Conventional oxidizing agents as dough conditioners include potassium bromate, potassium iodate, ammonium persulfate, and L-ascorbic acid. Conventional reducing agents include cystine. Further, enzymes (e.g., glucose oxidase, catalase, α-amylase, and hemicellulase), emulsifying agents (e.g., DATA-DATEM, CSL, SSL, and lecithin) have also been used in combination as a bread improver.

The phenomenon of bread's hardening with time has not been elucidated completely, but it is considered that bread usually increases hardness with aging of starch or as the molecules of starch associate to form a crystalline region. Hardening of bread is a big economical problem to bread manufacturers and consumers. That is, hardening of bread limits not only the shelf life of bread in retail stores but also the period consumers can keep in store. Various emulsifying agents known to be effective in extending the storage life of bread have been used.

However, the increase of consumers' resistance to the use of chemical additives in foods has accelerated the necessity to reduce or avoid addition of emulsifying agents. Therefore, use of the above-mentioned enzymes as a promising substitute for emulsifying agents has been given studies. Various types of enzymes that have been applied to bread manufacture are used for the improvement of processing and product characteristics in bread manufacture, and some of them have been used for suppression of hardening.

However, the conventional enzymatic dough conditioners are insufficient as a perfect substitute for an emulsifying agent and unsatisfactory with respect to workability and oven spring of dough. It has therefore been keenly demanded to develop a dough conditioner which is naturally occurring and capable of suppressing hardening of baked food.

SUMMARY OF THE INVENTION

In order to overcome the above problems, the inventors of the present invention have conducted extensive investigations into a variety of enzymes. As a result, they have found that addition of an effective amount of an enzyme preparation having raw starch decomposing activity to flour not only brings about marked improvement in processing characteristics in bread making but is highly effective in keeping softness of baked products, and thus completed a method for producing baked products using the enzyme.

Thus, the present invention provides a dough composition comprising not less than 15 units of a raw starch decomposing enzyme per kilogram of a raw material to be baked, which may further contain glucose oxidase and/or hemicellulase, a process for production thereof, and a baked food obtained therefrom.

DETAILED DESCRIPTION OF THE INVENTION

The term "raw material to be baked" as used herein means a material containing starch such as plain flour (a powder of wheat, hereinafter simply referred to as flour), powder of other cereal crops such as rye, and mixtures thereof. The term "dough" as used herein means a composition which comprises the raw material to be baked and a liquid for kneading (e.g., water, a dairy component, an egg component, etc.). The dough may also contain sugars, sodium chloride, shortening, yeast, etc. The dough is preferably a mixture ready to be steamed, baked or fried which is prepared by kneading a mix comprising a raw material to be baked such as flour, etc. as an essential material and other materials, such as fats and oils, saccharides (sugar etc.), dairy products (milk etc.), eggs, yeast, etc. and, if desired, various additives such as enzymes and emulsifying agents, together with liquid such as water, milk, and egg. The dough includes not only general one for making bread, either leavened or unleavened, but one for making doughnuts, pies, pizzas, pancakes, sponge cakes, crepes, rice cake, bun, etc. Therefore, the term "dough" is intended to include not only "dough" in its narrow sense of the word but pastry and batter. The term "bake" or "baking" as used herein means steaming, baking, frying, etc. in addition to usual baking.

The present invention relates to dough prepared by adding an enzyme having raw starch decomposing activity to a starch, such as flour, as a raw material to be baked in an amount of not less than 15 units per kilogram of the raw material. The starch content of the raw material to be baked such a flour is generally about 70%. The present invention further relates to a method for preparing a baked food characterized by a combined use of the enzyme having raw starch decomposing activity and various oligosaccharide producing enzymes, such as α-amylase, β-amylase, glucoamylase, cyclodextrin glucanotransferase, hemicellulase, xylanase, pentosanase, β-glucanase, cellulose, mannase, arabinofuranosidase, debranching enzymes, maltotriose producing enzymes, maltotetraose producing enzymes, maltopentaose producing enzymes, and maltohexaose producing enzymes, glucose oxidase, catalase, sulfhydryl oxidase, lipoxygenase, peroxidase, protease, peptidase, glutaminase, transglutaminase, lipase, phosphatase, etc. A combined use with glucose oxidase and/or hemicellulase is particularly preferred.

The baked products made from the dough of the present invention keep softness for an extended period of time. Where other enzymes are used in combination, the dough exhibits improved elasticity and assumes a tacky-dry state on its surface which greatly contributes to workability. The bread or the like prepared from the dough of the present invention also exhibits satisfactory properties.

With respect to starch in the raw state, general amylase species can hardly decompose the long-chain α-1→4 glucan. The terminology "enzyme having raw starch decomposing activity" or "raw starch decomposing enzyme" as used herein is intended to mean an amylase which can act on raw starch, i.e., starch before gelatinization. Known amylases of this type include those produced by microorganisms belong to genera Aspergillus, Bacillus, Rhizopus, and Zoogloea. More specifically, Gluczyme AF6 (a glucoamylase preparation of *Rhizopus niveus* origin, available from Amano Pharmaceutical Co., Ltd.), Glucoamylase Amano (a glucoamylase preparation of *Aspergillus niger* origin, available from Amano Pharmaceutical Co., Ltd.), and a raw starch decomposing enzyme of *Zoogloea ramigera* KO-159 origin (see Unexamined Published Japanese Patent Application 4-141082) can be mentioned as examples.

The raw starch decomposing enzyme according to the present invention is not particularly limited as long as it shows raw starch decomposing activity. The ratio of the raw starch decomposing activity per the soluble starch decomposing activing (%) as measured in the methods described below is preferably 0.1% or more, more preferably 1% or more, and most preferably 3% or more.

The raw starch decomposing enzyme introduced into dough hydrolyses raw starch constituting the raw material, such as flour. Since amylases that have been used as a bread improver hardly act on un-gelatinized starch, they are ineffective in dough in which starch is in a raw state. To the contrary, the enzyme having raw starch decomposing activity as used in the present invention acts on the raw starch from the stage of dough preparation to produce glucose, etc. thereby to accelerate fermentation by yeast.

The raw starch decomposing activity is determined as follows.

Measurement of Raw Starch Decomposing Activity

In a 100 ml-volume Erlenmeyer flask is put 10 ml of a 50 mg/ml suspension of fluor in a 0.05M acetate buffer (pH 5.0), and 0.1 ml of an enzyme solution is added thereto, followed by reacting for 1 hour while shaking in a thermostat kept at 40° C. at a frequency of 120/min with an amplitude of 3 cm so that the substrate may not stand still on the bottom of the flask. After the reaction, the reaction mixture is centrifuged at 3,000 rpm for 10 minutes to obtain a supernatant liquor. The produced reducing sugar in the supernatant liquor is quantitatively determined with a 3,5-dinitrosalicylic acid reagent based on a calibration curve of glucose. Enzyme activity which produces reducing sugar corresponding to 1 mg of glucose per 1 minute under the above conditions is taken as one unit.

Measurement of Soluble Starch Decomposing Activity

In a test tube is put 1 ml of a 10 mg/ml soluble starch solution in a 0.075 mol/l acetic acid•sodium acetate buffer (pH 5.0), and 0.5 ml of an enzyme solution is added thereto, followed by reacting for 15 minutes at 40° C. After the reaction, 3 ml of 3,5-dinitrosalicylic acid reagent (containing 10 g NaOH, 10 g of 3,5-dinitrosalicylic acid, 0.5 g of anhydrous sodium sulfate, and 40 ml of 5% phenol per 1 l of reagent) was added, and the mixture was heated on a boiling water bath for 20 minutes, followed by cooling with running water. Thereafter, 15.5 ml of water was added and the mixture was subjected to measurement of absorbance at the wavelength of 560 nm. Enzyme activity which produces reducing sugar corresponding to 1 $\mu$mol of glucose per 1 minute under the above conditions is taken as one unit.

The raw starch decomposing activity required in the present invention is 15 units or more per kilogram of the raw material to be baked. Less than 15 units cannot manifest the desired effects in improving softness and retarding hardening. A preferred range of the amount of the enzyme to be used is usually from 50 to 700 units.

While the optimum amount of the raw starch decomposing enzyme to be added is subject to variation depending on the kind of the grain as a raw material and the processes involved, it can easily be decided through a baking test.

As previously stated, the raw starch decomposing enzyme can be used in combination with other conventionally employed enzymes of various kinds. The feature of the present invention also lies in that a combined use of other enzymes surprisingly enhances the effects improving workability of dough and bread properties. For example, it has been ascertained that a combination with a general amylase which acts on gelatinized starch, hemicellulase or glucose oxidase produces complementary and synergistic effects.

The amylase which acts on gelatinized starch as referred to above means a commonly used amylase, such as $\alpha$-amylase, $\beta$-amylase or Aspergillus origin or malt origin, and isoamylase.

The hemicellulase includes species of *Aspergillus niger* origin and of *Aspergillus awamori* origin, which are known useful for baked products. Hemicellulase Amano 90 (available from Amano Pharmaceutical Co., Ltd.) can be mentioned as a specific example.

The glucose oxidase includes species of *Aspergillus niger* origin, such as Hyderase 15 (available from Amano Pharmaceutical Co., Ltd.).

Hemicellulase, when added to dough, produces excellent effects in improving such properties as volume and softness of baked products but tends to make the dough too soft and sticky and difficult to handle. These disadvantages of hemicellulase can be eliminated by using glucose oxidase in combination. Besides, a combined use of hemicellulase and glucose oxidase further improves the bread making properties compared with the use of hemicellulase alone.

In the present invention, it is preferable to added 0 to 50,000 units of hemicellulase and/or 0 to 1000 units of glucose oxidase per kilogram of a starch, such as flour. Preferably, these enzymes are used in 5 to 200 ppm, more preferably 20 to 80 ppm.

Although the present invention is not to exclude use of conventional dough conditioners, the use of a raw starch decomposing enzyme according to the present invention makes it possible to produce baked products which keep softness for an extended period of time without using conventional chemical additives such as emulsifying agents.

The activities of amylase that acts on gelatinized starch, hemicellulase, and glucose oxidase can be determined as follows.

Measurement of Amylase Activity

In a 100 ml-volume Erlenmeyer flask is put 10 ml of a substrate. After the flask is allowed to stand in a thermostat set at 40±0.1° C. for 10 minutes, 1 ml of an enzyme solution in a 0.05M acetic acid-sodium acetate buffer solution (pH 5.0) is added thereto, followed by shaking well. Immediately thereafter, the flask is placed in a thermostat kept at 40±0.1° C. and allowed to stand accurately for 30 minutes. In the flask is put 4 ml of a Fehling's solution, followed by shaking well. The mixture is placed on a glass ceramic plate set on a gas burner and heated while adjusting the heating power so that the mixture may boil in 60±30 seconds and boiled accurately for 2 minutes. After cooling with running water, 2 ml of a 30% aqueous potassium iodide solution and 2 ml of a 25% aqueous sulfuric acid solution are added to the reaction mixture in this order, immediately followed by titration with a 0.05M aqueous sodium thiosulfate solution (for quantitative determination). The time when the mixture turned white is taken as an end point. Where the end point is difficult to detect, two or three drops of a starch reagent solution are added to the reaction mixture, and titration is carried out until the system turned white. Separately, a blank test is carried out using water in place of the enzyme solution. Enzyme activity which brings about an increase in reducing power corresponding to 10 mg of glucose in 30 minutes is taken as one unit.

The substrate to be used in the above measurement is prepared by suspending 1 g of dried soluble starch in a small amount of water, adding the suspension to about 100 ml of boiling water, boiling the mixture for 5 minutes from the start of boiling, cooling the container with running water, adding 10 ml of a 1M acetic acid-sodium acetate buffer solution (pH 5.0), and adding water to make 200 ml.

Measurement of Hemicellulase Activity

To 1 ml of a substrate solution (10 mg/ml of xylan) is added 3 ml of a 0.1N acetate buffer (pH 4.5), followed by stirring. The solution is preheated at 40° C. for 10 minutes. Then 1 ml of an enzyme solution is added thereto, and the system is allowed to react at 40° C. for 30 minutes. After the reaction, 2 ml of a Somogyi's solution is added, followed by shaking, and the reaction mixture is heated in a boiling water bath for 20 minutes. After cooling, 1 ml of an ammonium arsenomolybdate solution is added to the reaction mixture, followed by shaking, and water is added thereto to make 25 ml. The mixture is centrifuged at 3000 rpm for 10 minutes, and the absorbance of the supernatant liquor at a wavelength of 500 nm is measured. Enzyme activity which produces reducing sugar corresponding to 1 mg of xylose per 1 minute is taken as 100 units.

Measurement of Glucose Oxidase Activity

In a quartz cell having a cell thickness of 10 mm are put 2 ml of a phosphate buffer containing 50 mg/ml of phenol, 0.5 ml of a substrate solution (2.5 g/ml of glucose), a peroxidase solution (0.5 ml; 25 units/ml of peroxidase), and a 4-aminoantipyrine solution (0.1 ml; 4 mg/ml) and allowed to stand at 37° C. for 10 minutes. To the mixture is added 0.1 ml of an enzyme solution, stirred well, and allowed to stand at 37° C. After 2 minutes' and 5 minutes' reacting, the absorbance of the reaction mixture at a wavelength of 500 nm is measured. Separately, a blank test is carried out using water in place of the enzyme solution. Enzyme activity that oxidizes 1 $\mu$mol of glucose per 1 minute is taken as one unit.

The enzymes which can be used in the present invention, such as the enzyme having raw starch decomposing enzyme, amylase acting on gelatinized starch, hemicellulase, glucose oxidase, etc. do not necessarily need to be purified preparations. Crude enzyme preparations can be used as well. The enzymes can be obtained by fermentation of microorganisms or a culture of the microorganisms may be used. If desired, the culture can be concentrated or dried.

The dough according to the present invention can further contain various components other than the above-described enzymes known in the art, for example, sugar, edible salt, lecithin, gluten, soybean powder, malt, and other enzymes.

The dough of the present invention can be baked in a usual manner into baked products by any of known bread making methods, such as a straight dough method, a no-time straight dough method, an overnight sponge and dough method, a sponge and dough method, a frozen dough method, and the like.

The present invention achieves considerable retardation of hardening of baked products as well as improvements in volume and softness of baked products. The present invention also brings about improvements in dough properties in terms of handling properties, elasticity, and extensibility in rolling and provides baked products with excellent appearance and palatability.

The present invention will now be illustrated in greater detail with reference to Test Example and Examples, but it should be understood that the present invention is not construed as being limited thereto, and various modifications which could be made therein by one skilled in the art are of necessity included under the scope of the present invention.

TEST EXAMPLE 1

Raw Starch Decomposing Activity and Soluble Starch Decompsing Activity of Various Enzymes Gluczyme AF6, Glucoamylase Amano, Biozyme F-10 (all available from Amano Pharmaceutical Co., Ltd.), and an enzyme of *Zoogloea ramigera* KO-159 origin (JP-A-4-141082) were subjected to measurements of raw starch decomposing activity and soluble starch decomposing activity. The results are shown in the following Table 1.

TABLE 1

|  | Raw Starch Decomposing Activity | Soluble Starch Decompsing Activity | Ratio (%) |
| --- | --- | --- | --- |
| Gluczyme AF6 | 1,480 | 25,700 | 5.76 |
| Glucoamylase Amano | 257 | 37,100 | 0.70 |
| raw starch decomposing enzyme of *Zoogloea ramigera* KO-159 origin | 569 | 18,500 | 3.08 |
| Biozyme F-10 | 303 | 488,000 | 0.062 |

TEST EXAMPLE 2

Effect of Raw Starch Decomposing Activity on Bread Making

Loaves of bread were made by a no-time straight dough method according to the following procedure using dough having the following formulation:

| Formulation 1 (control): | |
| --- | --- |
| Flour | 2000 g (100%) |
| Sugar | 100 g (5%) |
| Edible salt | 40 g (2%) |
| Shortening | 80 g (4%) |
| Baker's yeast | 60 g (3%) |
| Ascorbic acid | 40 mg (20 ppm) |
| Water | 1380 ml (69%) |

Loaves of bread were baked in the same manner except for adding to the dough Gluczyme AF6 (a glucoamylase preparation of *Rhizopus niverus* origin, produced by Amano Pharmaceutical Co., Ltd.) in the amounts shown below.

Formulation 1: Formulation 1 (no enzyme addition; control)

Formulation 2: formulation 1+15 units raw starch decomposition activity (7.5 unit/kg-flour)

Formulation 3: formulation 1+30 units raw starch decomposition activity (15 unit/kg-flour)

Formulation 4: formulation 1+75 units raw starch decomposition activity (37.5 unit/kg-flour)

Formulation 5: formulation 1+150 units raw starch decomposition activity (75 unit/kg-flour)

Procedure (1) Mixing: 4 mins at low speed →4 mins at high speed →addition of shortening →1 min at low speed →4 mins at medium speed →4 mins at high speed (2) Kneading: 27 to 29° C.

(3) First fermentation: 27° C.×30 mins.

(4) Division: into lumps of dough each weighing 450 g (5) Resting time: 30 mins.

(6) Final proof: 38° C.; height of dough is constant (3.5 cm above the mold) before baking.

(7) Baking: 230° C.×25 mins.

Evaluation on Dough (1) Workability in preparation

Evaluation on Bread (Product)

(1) Volume

The volume of the bread was measured by a rapeseed displacement method.

(2) Softness (measurement of indentation hardness by rheometer)

Conditions for measurement with a rheometer:
a. sample: crumb of a 2 cm-thick slice of bread
b. plunger: a disc plunger of 25 mm in diameter
c. rate of indentation: 2 cm/min
d. indentation: the load required to compress the crumb to a thickness of 0.5 mm was measured with a rheometer
e. storage of bread: 20° C.

(3) Color of crust
(4) Flavor
(5) Palatability

The evaluation of the dough and bread shown above were conducted by experts who have 6 years' experience in bread making with respect to the following properties in accordance with the following rating system. With respect to the softness, the measurement was made on the next day and after 5 days from the baking day.

Rating System
++: Very good as compared with control
+: Good as compared with control
±: Equal to control
−: Poor as compared with control
−−: Very poor as compared with control The results of evaluation are shown in Table 2 below.

TABLE 2

| Formu- lation No. | Volume (cc) | Softness of Crumb (g/cm$^2$) | | Color of Crust | Flavor | Palat- ability | Work- ability |
|---|---|---|---|---|---|---|---|
| | | After 1 Day | After 5 Days | | | | |
| 1 (control) | 2220 | 293 | 457 | ± | ± | ± | ± |
| 2 | 2240 | 285 | 449 | ± | ± | ± | ± |
| 3 | 2290 | 277 | 413 | + | + | ± | ± |
| 4 | 2310 | 280 | 390 | + | + | ± | ± |
| 5 | 2360 | 264 | 365 | + | + | ± | ± |

It is seen from the results in Table 2 that addition of 15 units or more of a raw starch decomposing enzyme per kilogram of flour is effective in improving softness and retarding hardening.

In the following Examples, the basic formulation of dough composition, procedures to prepare a bread, and methods for evaluations are basically the same with those in the Test Example 2 shown above.

EXAMPLE 1

Application of Raw Starch Decomposing Enzyme in Bread Making (1)

Loaves of bread were baked in the same manner as in Test Example 2 using dough composition having the same formulation. In Formulation 2, Gluczyme AF6 (a glucoamylase preparation of *Rhizopus niverus* origin, produced by Amano Pharmaceutical Co., Ltd.) was used as a raw starch decomposing enzyme. The dough and the bread obtained were evaluated in the same manner as in Test Example 2.

Formulation 1: the same as formulation 1 of Test Example 2 (Control)
Formulation 2: formulation 1+100 ppm Gluczyme AF6 (raw starch decomposing activity: 150 units)

The results of evaluation are shown in Table 3 below.

TABLE 3

| Formu- lation No. | Volume (cc) | Softness of Crumb (g/cm$^2$) | | Color of Crust | Flavor | Palat- ability | Work- ability |
|---|---|---|---|---|---|---|---|
| | | After 1 Day | After 5 Days | | | | |
| 1 (control) | 2230 | 281 | 443 | ± | ± | ± | ± |
| 2 | 2340 | 265 | 360 | + | + | ± | ± |

Further, the dough having formulation 1 or 2 was shaped and frozen in a blast freezer. After storage at −20° C. for 3 months, the frozen dough was thawed, allowed to ferment finally at 38° C., and baked. The resulting bread was evaluated in the same manner as in Test Example 2. The results are shown in Table 4.

TABLE 4

| Formu- lation No. | Volume (cc) | Softness of Crumb (g/cm$^2$) | | Color of Crust | Flavor | Palat- ability | Work- ability |
|---|---|---|---|---|---|---|---|
| | | After 1 Day | After 5 Days | | | | |
| 1 (control) | 2100 | 301 | 478 | ± | ± | ± | ± |
| 2 | 2210 | 281 | 379 | + | + | ± | ± |

As is apparent from Tables 3 and 4, dough containing a raw starch decomposing enzyme provides baked bread with an increased volume, an extended shelf life, and an improved brown on the crust. These effects are believed attributed to the raw starch decomposing activity of the enzyme which is exerted in the stage of dough preparation to produce glucose thereby to improve the fermentation power of baker's yeast. In other words, the raw starch decomposing enzyme works on starch in any stage of from dough preparation through baking to suppress staling of bread. These effects are significantly manifested as well when the dough is once frozen.

EXAMPLE 2

Application of Raw Starch Decomposing Enzyme in Bread Making (2)

Loaves of bread were baked and evaluated in the same manner as in Example 1 using dough having the following formulation. In formulations 2 to 8, Gluczyme AF6 (a glucoamylase preparation of *Rhizopus niveus* origin), Hemicellulase Amano 90 (a hemicellulase preparation of *Aspergillus niger* origin) and Hyderase 15 (a glucose oxidase preparation of *Aspergillus niger* origin), all produced by Amano Pharmaceutical Co., Ltd., were used as a raw starch decomposing enzyme, hemicellulase, and glucose oxidase, respectively. The dough and the bread obtained were evaluated in the same manner as in Test Example 2.

Formulation 1: the same as formulation 1 of Test Example 2 (control)
Formulation 2: formulation 1+100 ppm of Gluczyme AF6
Formulation 3: formulation 1+50 ppm of Hemicellulase Amano 90
Formulation 4: formulation 1+50 ppm of Hyderase 15
Formulation 5: formulation 1+50 ppm of Hemicellulase Amano 90+50 ppm of Hyderase 15

Formulation 6: formulation 1+100 ppm of Gluczyme AF6+50 ppm of Hemicellulase Amano 90

Formulation 7: formulation 1+100 ppm of Gluczyme AF6+50 ppm of Hyderase 15

Formulation 8: formulation 1+100 ppm of Gluczyme AF6+50 ppm of Hemicellulase Amano 90+50 ppm of Hyderase 15

The results of evaluation are shown in Table 5.

TABLE 5

| Formu-lation No. | Volume (cc) | Softness of Crumb (g/cm$^2$) | | Color of Crust | Flavor | Palat-ability | Work-ability |
|---|---|---|---|---|---|---|---|
| | | After 1 Day | After 5 Days | | | | |
| 1 | 2210 | 297 | 465 | ± | ± | ± | ± |
| 2 | 2380 | 255 | 351 | + | + | ± | ± |
| 3 | 2490 | 238 | 365 | + | ± | ± | − |
| 4 | 2250 | 301 | 450 | ± | ± | ± | + |
| 5 | 2480 | 251 | 376 | + | ± | ± | ± |
| 6 | 2520 | 222 | 333 | ++ | ++ | ± | − |
| 7 | 2390 | 250 | 340 | + | + | ± | ++ |
| 8 | 2550 | 230 | 330 | ++ | ++ | ± | ++ |

Further, the dough prepared was shaped and frozen in a blast freezer. After storage at −20° C. for 3 months, the frozen dough was thawed, allowed to ferment finally at 38° C., and baked. The resulting bread was evaluated in the same manner as in Test Example 2. The results are shown in Table 6.

TABLE 6

| Formu-lation No. | Volume (cc) | Softness of Crumb (g/cm$^2$) | | Color of Crust | Flavor | Palat-ability | Work-ability |
|---|---|---|---|---|---|---|---|
| | | After 1 Day | After 5 Days | | | | |
| 1 | 2070 | 310 | 487 | ± | ± | ± | ± |
| 2 | 2190 | 271 | 383 | + | + | ± | ± |
| 3 | 2350 | 279 | 390 | + | ± | ± | − |
| 4 | 2110 | 315 | 480 | ± | ± | ± | + |
| 5 | 2300 | 287 | 405 | + | ± | ± | ± |
| 6 | 2390 | 269 | 354 | ++ | ++ | ± | − |
| 7 | 2240 | 288 | 400 | + | + | ± | ++ |
| 8 | 2410 | 266 | 351 | ++ | ++ | + | ++ |

Tables 5 and 6 verify that a combined use of a raw starch decomposing enzyme (Gluczyme AF6) and Hemicellulase Amano 90 (formulation 6) produces appreciable effects in improving volume, flavor, duration of softness (shelf life), and browning of the crust over the control (formulation 1). These improvements are distinct even as compared with addition of the raw starch decomposing enzyme alone (formulation 2) or the hemicellulase alone (formulation 3).

The raw starch decomposing activity works in the dough to produce increased glucose and enhance the fermentation power of baker's yeast, bringing an improved flavor. Further, Hemicellulase Amano 90 acts to improve the mutual action between pentosan and gluten and also to improve the gas-holding power of the dough. As a result, the raw starch decomposing enzyme and the hemicellulase produce synergistic effects in increasing the bread volume.

The extension of the shelf life may be accounted for as a result of a summation of the effect of Hemicellulase Amano 90, the effect of the raw starch decomposing enzyme, and the effect of other amylase species present in Gluczyme AF6. That is, because not only damaged starch but raw starch (starch granules) undergo decomposition, the gelatinized starch's opportunities of recrystallizing (i.e., aging) are decreased.

It is also seen that a combined use of the raw starch decomposing enzyme and Hyderase 15 (formulation 7) brings noticeable improvements over the control (formulation 1) in volume, flavor, duration of softness of the crumb (shelf life), browning of the crust, and workability (ease of handling the dough). These improvements are distinct even as compared with addition of the raw starch decomposing enzyme alone (formulation 2) or Hyderase 15 alone (formulation 4).

The raw starch decomposing activity works in the dough to produce increased glucose and to enhance the fermentation power of baker's yeast. The produced glucose becomes a substrate of glucose oxidase so that Hyderase 15 can acts more effectively in improving the gluten network structure and eliminating stickiness thereby to improve workability of the dough.

Formulation 8, in which the raw starch decomposing enzyme, Hemicellulase Amano 90, and Hyderase 15 are used in combination, exhibits improvements in volume, flavor, shelf life, and workability. These effects can be accounted for as follows. The amount of glucose in the dough increases by the action of the raw starch decomposing enzyme to increase the fermentation power of yeast. Not only damaged starch but raw starch (starch granules) undergo decomposition thereby to strongly prevent recrystallization (i.e., aging) of the starch after gelatinization. On the other hand, Hemicellulase Amano 90 acts to improve the pentosan-gluten mutual action. The increased amount of glucose in the dough also accelerates the action of Hyderase 15 in making the dough viscoelastic.

It is known that addition of hemicellulase to dough generally exerts adverse influences on handling of dough, making the dough too soft and sticky. The combined use of Hyderase 15 not only compensates for such disadvantages of hemicellulase but also imparts elasticity to the dough and makes the dough tacky-dry, which is of advantage for bread manufacture.

EXAMPLE 3

Application of Raw Starch Decomposing Enzyme in Bread Making (3)

Loaves of bread were baked in the same manner as in Example 1 using a dough composition having the same formulation. In Formulation 2, Glucoamylase Amano (a glucoamylase preparation of *Aspergillus niger* origin, produced by Amano Pharmaceutical Co., Ltd.) was used as a raw starch decomposing enzyme. The dough and the bread obtained were evaluated in the same manner as in Test Example 2.

Formulation 1: the same as formulation 1 of Test Example 2 (control)

Formulation 2: formulation 1+100 ppm Glucoamylase Amano (raw starch decomposing activity: 60 units)

The results of evaluation are shown in Table 7 below.

TABLE 7

| Formu-lation No. | Volume (cc) | Softness of Crumb (g/cm$^2$) | | Color of Crust | Flavor | Palat-ability | Work-ability |
|---|---|---|---|---|---|---|---|
| | | After 1 Day | After 5 Days | | | | |
| 1 (control) | 2210 | 285 | 449 | ± | ± | ± | ± |
| 2 | 2310 | 270 | 390 | + | + | ± | ± |

Further, the dough having formulation 1 or 2 was shaped and frozen in a blast freezer. After storage at −20° C. for 3 months, the frozen dough was thawed, allowed to ferment finally at 38° C., and baked. The resulting bread was evaluated in the same manner as in Test Example 2. The results are shown in Table 8.

TABLE 8

| Formu-lation No. | Volume (cc) | Softness of Crumb (g/cm²) | | Color of Crust | Flavor | Palat-ability | Work-ability |
|---|---|---|---|---|---|---|---|
| | | After 1 Day | After 5 Days | | | | |
| 1 (control) | 2090 | 299 | 465 | ± | ± | ± | ± |
| 2 | 2230 | 295 | 399 | + | + | ± | ± |

Tables 7 and 8 prove that addition of a raw starch decomposing enzyme to dough produces very satisfactory results similarly to Example 1.

EXAMPLE 4

Application of Raw Starch Decomposing Enzyme in Bread Making (4)

Loaves of bread were baked in the same manner as in Example 1 using a dough composition having the same formulation. In Formulation 2, a raw starch decomposing enzyme of *Zoogloea ramigera* KO-159 origin was used as a raw starch decomposing enzyme. The dough and the bread obtained were evaluated in the same manner as in Test Example 2.

Formulation 1: the same as formulation 1 of Test Example 2 (control)

Formulation 2: formulation 1+ a raw starch decomposing enzyme of *Zoogloea ramigera* KO-159 origin (raw starch decomposing activity: 100 units)

The results of evaluation are shown in Table 9 below.

TABLE 9

| Formu-lation No. | Volume (cc) | Softness of Crumb (g/cm²) | | Color of Crust | Flavor | Palat-ability | Work-ability |
|---|---|---|---|---|---|---|---|
| | | After 1 Day | After 5 Days | | | | |
| 1 | 2240 | 280 | 455 | ± | ± | ± | ± |
| 2 | 2330 | 275 | 395 | + | + | ± | ± |

It is seen that addition of a raw starch decomposing enzyme to dough produces very satisfactory results similarly to Example 1.

The raw starch decomposing enzyme used in the present invention is a naturally-occurring substance of high safety.

The present invention is applicable to various methods for making bread and achieves high quality of baked products which has not been obtained by conventional techniques. The present invention makes it possible to retard hardening of bread without using a chemical emulsifying agent while retaining excellent dough workability. Accordingly, the enzyme according to the present invention substitutes for conventional emulsifying agents as a dough conditioner.

While the invention has been described in detail and with reference to specific embodiments thereof, it will be apparent to one skilled in the art that various changes and modifications can be made therein without departing from the spirit and scope thereof.

This application is based on Japanese patent application Hei-9-315953, filed on Oct. 31, 1997, incorporated herein by reference.

What is claimed is:

1. A dough composition which comprises a raw material to be baked and an enzyme having raw starch decomposing activity in 15 units or more per kilogram of a raw material to be baked, and at least one enzyme selected from the group consisting of glucose oxidase and hemicellulase.

2. The dough composition according to claim 1, which comprises glucose oxidase.

3. The dough composition according to claim 1 or 2 which comprises hemicellulase.

4. The dough composition according to claim 1, wherein the enzyme having raw starch decomposing activity has a ratio of raw starch decomposing activity to soluble starch decomposing activity of at least 0.1%.

5. The dough composition according to claim 1, wherein the enzyme having raw starch decomposing activity has a ratio of raw starch decomposing activity to soluble starch decomposing activity of at least 1%.

6. The dough composition according to claim 1, wherein the enzyme having raw starch decomposing activity has a ratio of raw starch decomposing activity to soluble starch decomposing activity of at least 3%.

7. A method for preparing a dough composition, which comprises adding an enzyme having raw starch decomposing activity in an amount of not less than 15 units per kilogram of a raw material to be baked, and adding an at least one enzyme selected from the group consisting of glucose oxidase and hemicellulase.

8. A baked food composition which is obtained by preparing a dough composition by the method according to claim 7 and baking the dough.

\* \* \* \* \*